Figure 1:
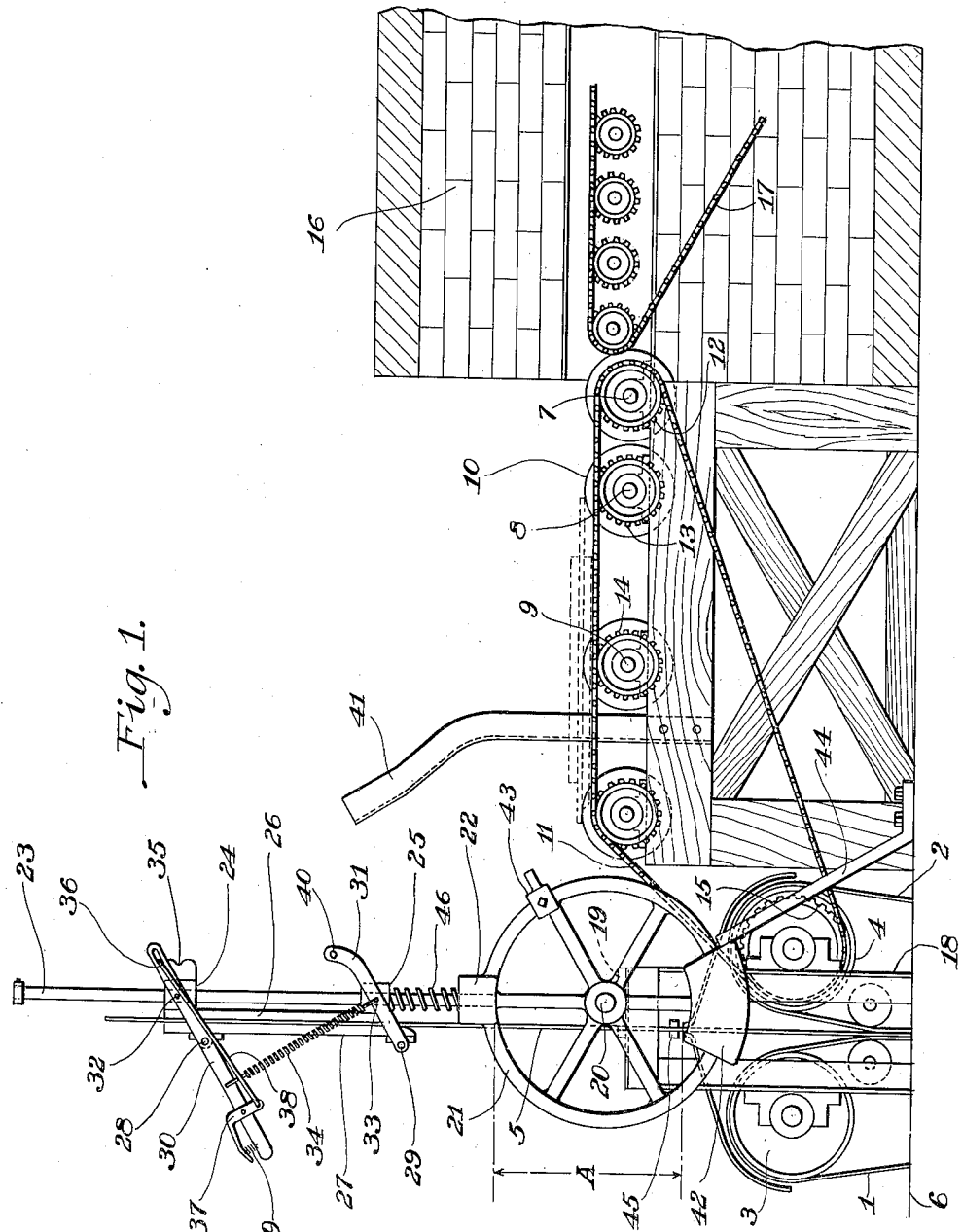

June 8, 1926.

W. OWEN 1,587,549

APPARATUS FOR HANDLING GLASS SHEETS

Filed Feb. 16, 1924     3 Sheets-Sheet 1

INVENTOR
William Owen
by
James C. Bradley
Atty.

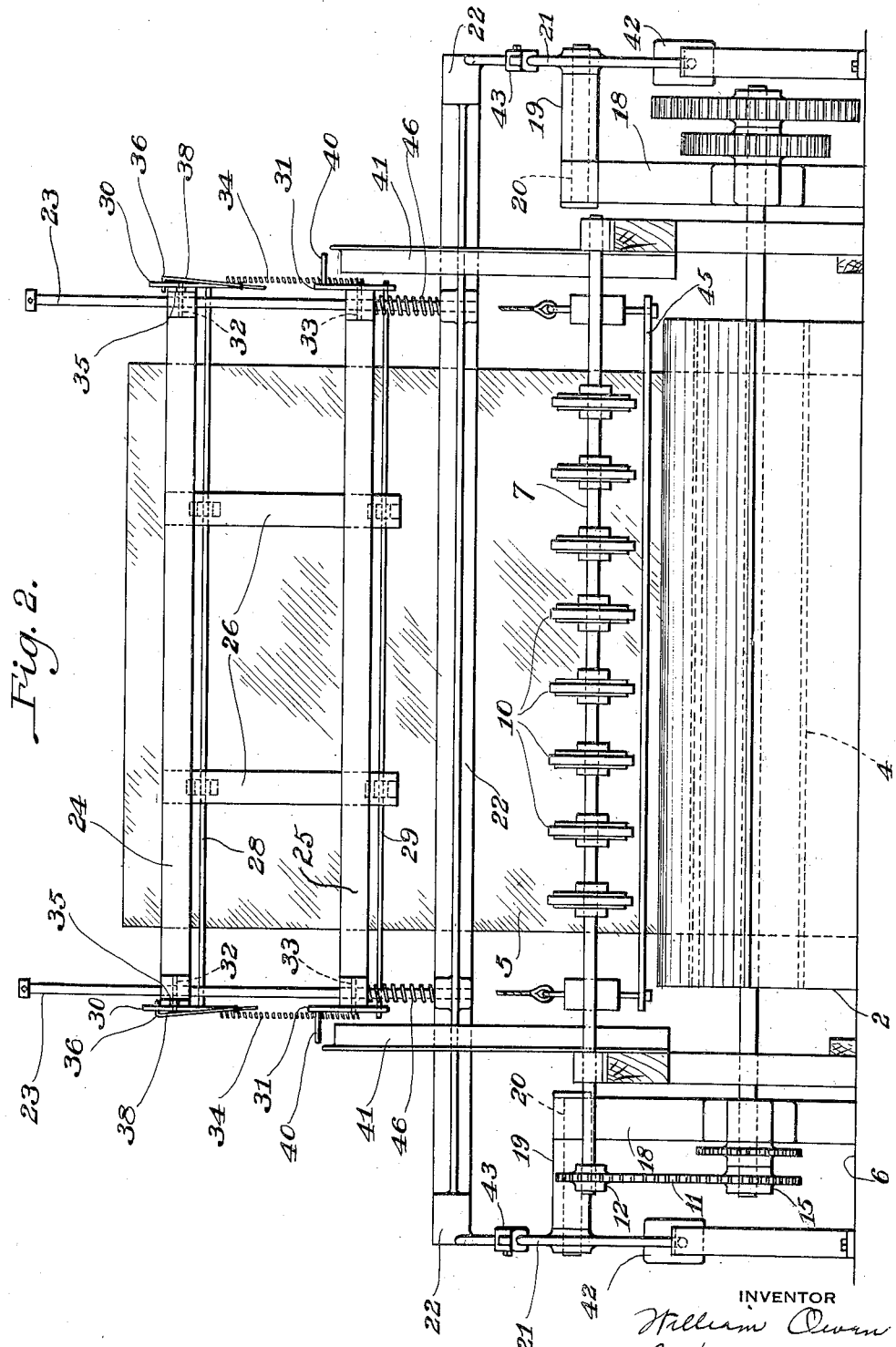

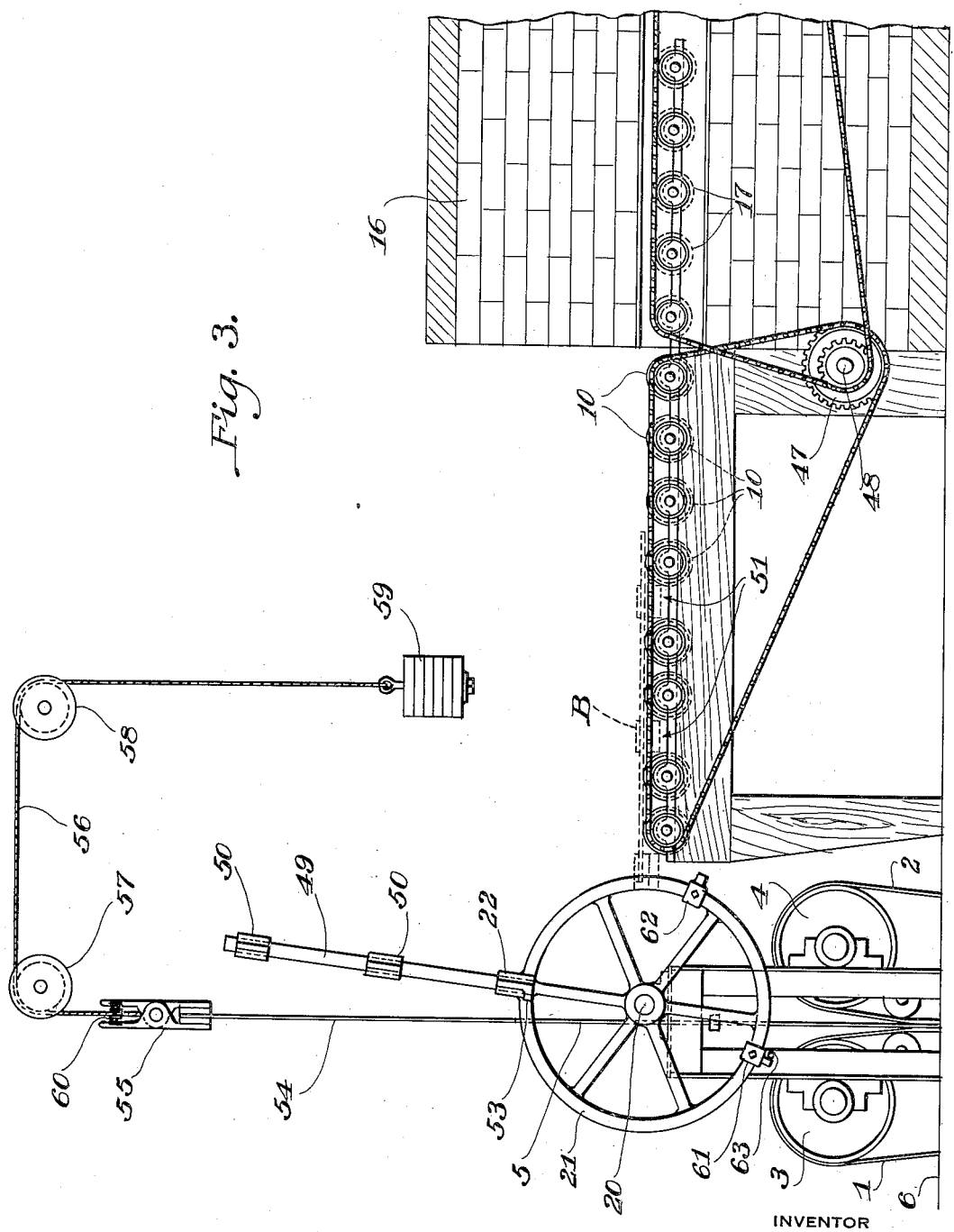

Patented June 8, 1926.                                                    1,587,549

UNITED STATES PATENT OFFICE.

WILLIAM OWEN, OF PITTSBURGH, PENNSYLVANIA, ASSIGNOR TO PITTSBURGH PLATE GLASS COMPANY, A CORPORATION OF PENNSYLVANIA.

APPARATUS FOR HANDLING GLASS SHEETS.

Application filed February 16, 1924. Serial No. 693,241.

The invention relates to apparatus for handling glass sheets as produced in a continuous vertical drawing operation such as that shown and described in the application of H. G. Slingluff, Serial Number 621,184, filed February 26, 1923 wherein the glass is drawn between a pair of asbestos belts, at the upper ends of which the glass emerges and is cut into lengths. The present invention has for its objects, the provision of improved means for supporting the glass sheets after they are cut off and placing them upon a horizontal carrier device, thus relieving the operator or operators of a considerable part of the hand labor otherwise required. As illustrated, the horizontal carrier to which the sheets are transferred leads to a leer for annealing, or flattening, or both, but in some cases, the leer may not be required and the carrier may lead to a point where the sheets are removed and stacked for storage or further transfer, or to the cutting room. Certain embodiments of the invention are illustrated in the accompanying drawings wherein:

Figure 1 is a side elevation of the apparatus. Fig. 2 is an end elevation looking at the construction of Fig. 1 from the right hand side thereof. And Fig. 3 is a side elevation of a modified form of apparatus.

Referring to the drawings, 1 and 2 are a pair of endless asbestos belts, such as are illustrated in the application heretofore referred to, such belts passing over the pulleys 3 and 4 at their upper ends, and 5 is a continuous glass sheet or ribbon which is being drawn from a molten bath, the apparatus lying below the floor 6 being preferably the same throughout as that shown in the Slingluff application referred to, although the present invention is not limited to any particular type of vertical drawing apparatus. Extending laterally from the line of draw of the machine, is a continuously operating carrier made up of a plurality of shafts 7, 8, 9, etc. each carrying a series of spaced rollers 10. The shafts are driven by means of the sprocket chain 11 passing around sprocket wheels 12, 13, 14, etc. mounted on the ends of the shafts 7, 8, 9, etc. and around a drive sprocket 15 on the shaft which carries the pulley 4. The rolls 10 preferably consist of discs of asbestos fiber clamped between side plates so as to give a relatively yielding non-metallic supporting means for the glass sheets during their movement along this table. This carrier or table preferably delivers at its right hand end to the leer 16 provided with a series of rollers 17 for supporting the glass sheets, which are passed through the leer, in case the sheets require any further annealing or flattening.

At each side of the upper end of the drawing machine is a standard or base 18 as indicated in Fig. 2, such standards having at their upper ends the long bearings 19, 19 in which are mounted the shafts 20, 20 carrying at their outer ends the wheels 21, 21. Extending transversely from one wheel to the other is a rigid frame member or cross tie 22, which in turn is provided with a pair of upstanding guide posts 23, 23. Mounted for sliding movement upon the posts are a pair of transverse frame members 24 and 25 secured rigidly together by the rear clamping members 26, 26. In opposition to the rear clamping members 26, 26 are a pair of front clamping members 27, 27. These latter clamping members are mounted upon a pair of transverse rods 28 and 29 which are coextensive in length with the frame members 24 and 25 and are mounted at their ends in the pairs of levers 30 and 31. These levers are pivoted at their upper ends at 32 and 33 in suitable brackets mounted on the ends of the transverse frame members 24 and 25. A parallel supporting link mechanism is thus provided for the opposing clamping members 26 and 27 so that when either of the levers or arms 30 or 31 are swung in a clockwise direction about the pivots 32 and 33, the front clamping member 27 is moved away from the rear clamping member 26, but is always maintained parallel thereto. The clamping member 27 is normally held in clamping position by means of a pair of springs 34 connecting the two sets of levers 30 and 31. The upper frame member 24 also carries a pair of brackets having the latching recesses 35 adapted to be engaged by latching pins 36 carried on the levers 30 when the outer ends of such levers are swung upwardly to move the clamping member 27 to open position at which time the latching pins engage the recesses 35 and hold the clamps in open position. The latching pins are operated from suitable hand levers 37 and connecting rods 38, the handles of the levers being normally pressed upward by means of springs 39, The levers 31 are provided at their ends with laterally projecting pins 40 adapted to engage the cams 41 when the frame carrying the glass is swung from the vertical position shown in full lines to the horizontal position shown in dotted lines, which engagement actuates the levers 31 to swing them about their pivots 33 and thus open the clamp member 27 to free the glass sheet.

The wheels 21, 21 are provided with a pair of counterweights 42, 42 so that the frame carrying the clamp will normally assume the upright position illustrated in full lines in Fig. 1. In order to position the frame, when it is swung about the shafts 20, 20 to the horizontal position illustrated in Fig. 2, the stops 43 are provided upon the wheels, such stops being adapted to come into engagement with the inclined braces 44 constituting a part of the supporting standards 18. The cutting off is preferably accomplished by means of a pair of electrically heated ribbons 45 lying on opposite sides of the glass and mounted so as to move upward with the glass while they are heating it preliminary to the cracking operation, such cutting off device being fully shown and described in the Slingluff Patent No. 1,373,533 of April 5th, 1921. This cutting off operation is carried on while the cutting off device is passing through the space marked A, and it will be understood that any other desired form of cutting off means might be employed in place of the one referred to, such device, however, being preferred because of its special adaptability for use with glass when it is hot or imperfectly annealed. Springs 46 are employed on the posts 23, 23 to cushion the downward movement of the clamping frame.

The operation of the device is as follows: Starting with the parts in the position of Fig. 1, but with the clamping plate 27 in open position, and the latching pins 36 in their recesses 35 in order to hold such clamping member in this position, the upwardly moving sheet of glass 5 passes between the clamping members 26 and 27 to the position indicated in Fig. 1, at which time the hand levers 37 on the levers 30 are pressed down to release the catch pins 36 and permit the springs 34 to press the clamping members 27 into engagement with the glass. As the clamping frame now moves upward with the glass, the electrical cut off 45 is applied to crack off the sheet. After it is cracked off, the wheels 21 are rotated 90 degrees swinging the clamping frame to the position illustrated in dotted lines. During this movement, the cams 41 engage the pins 40 on the levers 31 swinging such levers about their pivots 33 and opening the clamps 27, so that when the glass engages the rollers 10 of the carrier table, it is free to be moved by such rollers out of the clamp and into the leer. The movement of the clamping members to open position brings the latching pins 36 into the recesses 35 so that the clamping member 27 will be held in open position until released by operating the handles 37. As soon as the glass sheet passes from between the clamping members, the wheels 21, 21 are rotated in the reverse direction to bring the clamping apparatus again to vertical position, the clamp now being open and ready to receive another sheet.

An alternative and somewhat similar form of apparatus is shown in side elevation in Fig. 3. In this construction, the roller transfer table made up of the discs 10 is the same as in the other construction, but is shown as driven from a sprocket wheel 47 on the shaft 48 instead of being driven from the shaft of the pulley 4. The construction of the drawing machine, transfer table and leer is the same as heretofore described in connection with the apparatus of Figs. 1 and 2 and the same reference numerals are employed in designating these parts which require no further description. A pair of shafts 20 carrying the wheels 21 are also employed as in the first type of construction and the upper sides of the wheels are connected by means of a tie rod or frame member 22 like that shown in Figs. 1 and 2. Projecting upwardly from the transverse frame member or bar 22 are a pair of posts 49 connected together by means of strips 50 adapted to act as supporting means for the glass sheets in transferring them from vertical to horizontal position. The roller discs 10 are spaced apart to provide the spaces 51 for the two upper transverse strips 50 when the frame is swung to horizontal position as indicated at B in dotted lines in Fig. 3. This permits the frame to be swung down to position such that the weight of the glass is transferred from the strips to the roller discs 10. The lower strip 50 is provided with a projecting ledge or toe 53 for acting as a support for the lower edge of the glass sheet 54 which has been cut off. In order to support the glass sheet during the cutting off operation and during its transfer to the tilting frame, the clamp 55 is employed, counterbalanced by means of the cable 56 passing over the pulleys 57 and 58 and carrying the weights 59 at its other end. The jaws of the clamp 55 are yieldingly held closed by means of a spring 60.

In operation, the upper edge of the continuously formed sheet of glass is engaged by the clamp, which engagement continues until the sheet has attained a length suitable for cutting off when it is cut off by means of the electrically heated ribbons or other suitable means. The sheet is now supported by the clamp 55 and the operator swings its lower edge over the ledge 53, pressing the sheet against the tilting frame and releasing the clamp, after which the frame is swung to horizontal position. When it reaches horizontal position, the glass is engaged by the roller discs 10 and is moved into the leer 16, leaving the frame free to be returned to its original position. The wheels 21 are preferably provided with a pair of stops 61 and 62 for engaging the fixed stop pins 63 when the frame is in its two extremes of movement.

What I claim is:

1. The combination with a vertical drawing machine, for drawing a continuous sheet or ribbon of glass, of a driven carrier lying above the machine and extending laterally from the side of the glass sheet emerging from the upper end thereof, a transfer frame pivoted adjacent the level of the carrier between the end of the carrier and the line of draw, so that in one position it extends upwardly along such line of draw in approximate alignment therewith and in its other position it extends laterally overlapping the carrier, so that a glass sheet on the frame is engaged by the carrier, cutting off means for the glass, and clamping and steadying means above such last means movable upward with the sheet and engaging the upper portion thereof before and after the cutting off operation, the said transfer frame bing adapted to support the glass sheet cut from the continuous sheet during the movement of such frame from an upright position to a horizontal position.

2. The combination with a vertical drawing machine for drawing a continuous sheet or ribbon of glass, of a driven carrier lying above the machine and extending laterally from the side of the glass sheet emerging from the upper end thereof, a transfer frame pivoted adjacent the level of the carrier between the end of the carrier and the line of draw, so that in one position it extends upwardly along such line of draw in approximate alignment therewith and in its other position it extends laterally overlapping the carrier so that a glass sheet on the frame is engaged by the carrier, cutting off means for the glass, clamping and steadying means above such last means movable upward with the sheet and engaging the upper portion thereof before and after the cutting off operation, the said transfer frame being adapted to support the glass sheet cut from the continuous sheet as the frame moves from a vertical to a horizontal position, and stop means for limiting the movement of the carrier.

3. The combination with a vertical drawing machine for drawing a continuous sheet or ribbon of glass, of a driven carrier lying above the machine and extending laterally from the side of the glass sheet emerging from the upper end thereof, a transfer frame pivoted adjacent the level of the carrier between the end of the carrier and the line of draw, so that in one position it extends upwardly along such line of draw in approximate alignment therewith and in its other position it extends laterally overlapping the carrier so that a glass sheet on the frame is engaged by the carrier, cutting off means for the sheet, means carried by the frame for supporting a glass sheet (cut from the continuous sheet) upon such frame when in its upright position, and clamping means for the sheet movable upward therewith for supporting it during a portion of its upward travel.

4. The combination with a vertical drawing machine for drawing a continuous sheet or ribbon of glass, of a driven carrier lying above the machine and extending laterally from the side of the glass sheet emerging from the upper end thereof, a transfer frame pivoted adjacent the level of the carrier between the end of the carrier and the line of draw, so that in one position it extends upwardly along such line of draw in proximity thereto and in its other position, it extends laterally overlapping the carrier so that a glass sheet on the frame is engaged by the carrier, means carried by the frame for supporting a glass sheet (cut from the continuous sheet) upon such frame when in its upright position, and clamping means for the sheet carried by the frame and movable upward therewith for supporting it during the cutting off of the sheet.

5. The combination with a vertical drawing machine for drawing a continuous sheet or ribbon of glass of a driven carrier lying above the machine and extending laterally from the side of the glass sheet emerging from the upper end thereof, a transfer frame pivoted adjacent the level of the carrier between the end of the carrier and the line of draw, so that in one position it extends upwardly along such line of draw in proximity thereto and in its other position it extends laterally overlapping the carrier so that a glass sheet on the frame is engaged by the carrier, means carried by the frame for supporting a glass sheet (cut from the continuous sheet) upon such frame when in its upright position, clamping means for the sheet carried by the frame and movable upward therewith for supporting it during and after the cutting off of the sheet, and automatic means for releasing the clamping means when the frame is swung downward to deposit the sheet upon the carrier.

6. The combination with a vertical drawing machine for drawing a continuous sheet or ribbon of glass, of a driven carrier lying above the machine and extending laterally from the side of the glass sheet emerging from the upper end thereof, a transfer frame pivoted adjacent the level of the carrier between the end of the carrier and the line of draw, so that in one position it extends upwardly along such line of draw in proximity thereto and in its other position it extends laterally overlapping the carrier so that a glass sheet on the frame is engaged by the carrier, means carried by the frame for supporting a glass sheet (cut from the continuous sheet) upon such frame when in its upright position, clamping means for the sheet carried by the frame and movable upward therewith for supporting it during and after the cutting off of the sheet, and means operated by the downward swinging movement of the frame for releasing the clamp from the sheet.

7. The combination with a vertical drawing machine for drawing a continuous sheet or ribbon of glass, of a driven carrier lying above the machine and extending laterally from the side of the glass sheet emerging from the upper end thereof, a transfer frame pivoted adjacent the level of the carrier between the end of the carrier and the line of draw, so that in one position it extends upwardly along such line of draw in proximity thereto and in its other position it extends laterally overlapping the carrier so that a glass sheet on the frame is engaged by the carrier, means carried by the frame for supporting a glass sheet (cut from the continuous sheet) upon such frame when in its upright position, clamping means for the sheet carried by the frame and movable upward therewith for supporting it during and after the cutting off of the sheet, means operated by the downward swinging movement of the frame for opening the clamp to release it from the sheet, and a latch which automatically engages when the clamp is opened to retain it in such open position.

In testimony whereof, I have hereunto subscribed my name this 12th day of Feb. 1924.

WILLIAM OWEN.